United States Patent
Khan et al.

(10) Patent No.: US 12,190,068 B2
(45) Date of Patent: Jan. 7, 2025

(54) SYSTEMS AND METHODS FOR GENERATING REAL-TIME DYNAMIC CONVERSATIONAL RESPONSES DURING CONVERSATIONAL INTERACTIONS USING MACHINE LEARNING MODELS

(71) Applicant: Capital One Services, LLC, McLean, VA (US)

(72) Inventors: Md Arafat Hossain Khan, Dallas, TX (US); Isha Chaturvedi, Mountain View, CA (US); Arturo Hernandez Zeledon, Arlington, VA (US); Mohammad Sorower, McLean, VA (US)

(73) Assignee: Capital One Services, LLC, McLean, VA (US)

(*) Notice: Subject to any disclaimer, the term of this patent is extended or adjusted under 35 U.S.C. 154(b) by 281 days.

(21) Appl. No.: 17/850,282

(22) Filed: Jun. 27, 2022

(65) Prior Publication Data

US 2023/0419046 A1  Dec. 28, 2023

(51) Int. Cl.
*G06F 40/35* (2020.01)
*G06F 18/214* (2023.01)
*G06N 20/00* (2019.01)

(52) U.S. Cl.
CPC .......... *G06F 40/35* (2020.01); *G06F 18/2155* (2023.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,442,612 | B2* | 9/2022 | McKay | G06F 3/04886 |
| 11,908,463 | B1* | 2/2024 | Biswas | G10L 15/1815 |
| 2006/0031077 | A1* | 2/2006 | Dalton | G06Q 30/02 |
| | | | | 702/27 |
| 2020/0334740 | A1* | 10/2020 | Bedell | G06Q 30/0641 |
| 2022/0012604 | A1* | 1/2022 | Mumma | G06Q 20/3227 |
| 2022/0108080 | A1* | 4/2022 | Munavalli | G06N 3/08 |
| 2022/0247699 | A1* | 8/2022 | Gupta | H04L 51/02 |
| 2023/0026945 | A1* | 1/2023 | Friedlander | G06N 3/045 |

* cited by examiner

*Primary Examiner* — Stella L. Woo
(74) *Attorney, Agent, or Firm* — Foley & Lardner LLP

(57) ABSTRACT

Methods and systems are presented for generating real-time dynamic conversational responses during conversational interactions using machine learning models based on historic intents for a plurality of users and user-specific interactions. The machine learning models comprise a neural network trained to select a first intent from a plurality of intents based on historic data accumulated prior to the conversational interaction and a neural network trained to select a first interaction-specific intent from a plurality of interaction-specific intents based on interaction-specific data for a user.

20 Claims, 6 Drawing Sheets

SYSTEMS AND METHODS FOR GENERATING REAL-TIME DYNAMIC CONVERSATIONAL RESPONSES DURING CONVERSATIONAL INTERACTIONS USING MACHINE LEARNING MODELS

BACKGROUND

In recent years, the number and uses of interactive applications have risen considerably. In tandem with this rise is the need to have human-like interactions and/or create applications that mimic the tone, cadence, and speech patterns of humans. Additionally, in order to fulfill user-interaction requirements, these applications need to be helpful, and thus respond intelligently by providing relevant responses to user inputs, whether these inputs are received via text, audio, or video input.

Similarly, in recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring that it is high quality is often complex and time-consuming. Second, despite the mainstream popularity of artificial intelligence, practical implementations of artificial intelligence require specialized knowledge to design, program, and integrate artificial intelligence-based solutions, which limits the number of people and amount of resources available to create these practical implementations. Finally, results based on artificial intelligence are notoriously difficult to review because the process by which the results are obtained may be unknown or obscured. This obscurity creates hurdles for identifying errors in the results, as well as improving the models providing the results. These technical problems present an inherent problem with attempting to use an artificial intelligence-based solution in generating real-time dynamic conversational responses during conversational interactions.

SUMMARY

Methods and systems are described herein for generating dynamic conversational responses. Conversational responses include communications between a user and a system that may maintain a conversational tone, cadence, or speech pattern of a human during an interactive exchange between the user and the system. The interactive exchange may include the system responding to one or more user actions (or inactions) and/or predicting responses prior to receiving a user action. In order to maintain the conversational interaction during the exchange, the system must generate responses that are both timely and pertinent (e.g., in a dynamic fashion). This requires the system to determine both quickly (i.e., in real time or near real time) and accurately the intent, goal, or motivation behind a user input. These user inputs or actions may take various forms, including speech commands, textual inputs, responses to system queries, and/or other user actions (e.g., logging into a mobile application of the system). In each case, the system must aggregate information about the user action, information about the user, and/or other circumstances related to the user action (e.g., time of day, previous user actions, current account settings, etc.) in order to determine a likely intent of the user.

In order to determine the likely intent and generate a dynamic conversational response that is both timely and pertinent, the methods and systems described herein use one or more machine learning models. For example, the methods and systems may use a machine learning model in which information about the user action is used to generate a feature input for the machine learning model. This feature input is then input into the machine learning model to generate conversational responses. For example, the feature input may include information about the user action, information about the user, and/or other circumstances related to the user action (e.g., time of day, previous user actions, current account settings, etc.). The feature input (e.g., a vector of data) may express the information quantitatively or qualitatively in a format that may be used by the model.

However, the difficulty in adapting artificial intelligence models for this practical benefit faces several technical challenges. First, the feature inputs for similar intents (e.g., a first intent of a user to learn his/her maximum credit limit and a second intent of a user to learn a current amount in his/her bank account) may have similar feature inputs because much of the underlying information may be the same. Second, training data for different scenarios (e.g., different conversational interactions resulting in different actual intents being determined) may be sparse. Third, the training data that is available may have biases introduced as part of the automation of the response. For example, in conventional systems, particularly those in which automatic responses are generated, there is a bias towards generating responses immediately upon a user action being received. That is, upon receiving a user input (e.g., representing a user action), conventional systems immediately retrieve available information and generate a response. While such a process is efficient and in line with traditional machine logic, such a process diverges from human-to-human conversational interactions. For example, in human-to-human conversational interactions, pauses before and after a user action may indicate a user's level of uncertainty in the action and/or intent. In another example, a cadence of a series of interactions may indicate a confidence and/or accuracy of the actions and responses.

To account for both the lack of quality training data and/or bias in that training data, the systems and methods use a machine learning model with components trained on historic intents for a plurality of users as well as user-specific interactions. More precisely, the systems and methods described generate real-time dynamic conversational responses during conversational interactions using a first machine learning model that generates user intents based on historic data accumulated prior to conversational interactions and a second machine learning model that generates user interaction-specific intents based on interaction-specific data for a user accumulated during the conversational interactions. That is, the systems and methods use two different types of machine learning models in conjunction that are each trained on different types of data. The specific architecture and the specific types of data result in improved conversational responses while mitigating the technical problems discussed above.

For example, a first machine learning model comprises a neural network trained to select a first intent from a plurality of intents based on historic data accumulated prior to conversational interactions. Notably, a neural network may be used to process multi-modal and/or multidimensional data. Because of this, the system may retrieve data from a plurality of sources and/or types. Accordingly, the system may pull data about a user, data about a user group, and/or user profile information. The vast amount of and differences in these data types allow the system to generate feature inputs that are distinguishable for the different intents (e.g., addressing the first technical problem discussed above).

The systems and methods then augment this model with an additional component featuring a second machine learning model that comprises a neural network trained to select a first interaction-specific intent from a plurality of interaction-specific intents based on interaction-specific data for the user accumulated during the conversational interactions. The use of the neural network (e.g., more specifically a graph neural network trained to predict a next node in an intent graph based on a current node), while more restrictive in the amount, type, and dimensions of training data that may be processed as compared to a decision tree classifier, allows for the incorporation of a temporal element into the analysis. This additional temporal element (e.g., the sequence of user actions and/or determined intents) allows for more precision in the determinations made by the model (e.g., addressing the second and third technical problems discussed above).

In some aspects, systems and methods are described for generating real-time dynamic conversational responses during conversational interactions using machine learning models based on historic intents for a plurality of users and user-specific interactions. For example, the system may receive, from a first user, a first user action during a conversational interaction with a user interface. The system may generate a first feature input based on the first user action. The system may input the first feature input into a first machine learning model, wherein the first machine learning model comprises a neural network trained to select a first intent from a plurality of intents based on historic data accumulated prior to the conversational interaction. The system may generate for display, at the user interface during the conversational interaction, a first dynamic conversational response based on the first intent. The system may receive, from the first user, a second user action during the conversational interaction. The system may generate a second feature input based on the second user action and the first intent. The system may input the second feature input into a second machine learning model, wherein the second machine learning model comprises a neural network trained to select a first interaction-specific intent from a plurality of interaction-specific intents based on interaction-specific data for the first user. The system may generate for display, at the user interface during the conversational interaction, a second dynamic conversational response based on the first interaction-specific intent.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
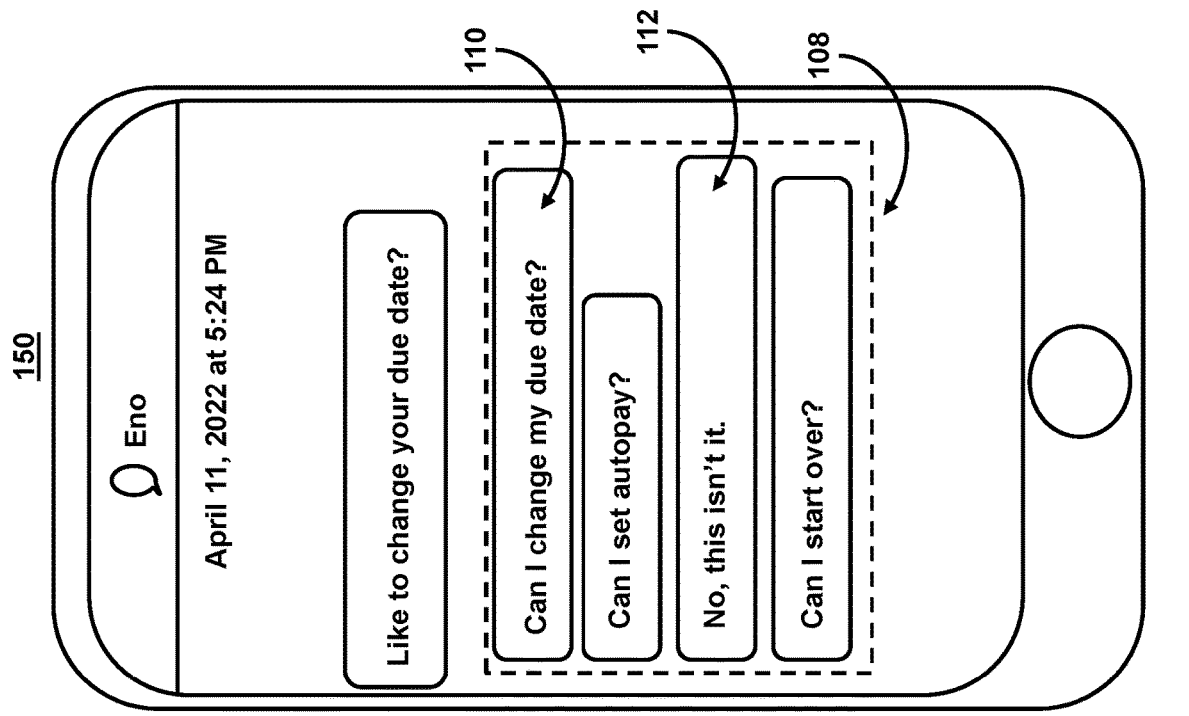
FIG. 1 shows an illustrative user interface for presenting dynamic conversational responses using machine learning models, in accordance with one or more embodiments.
Figure 1:
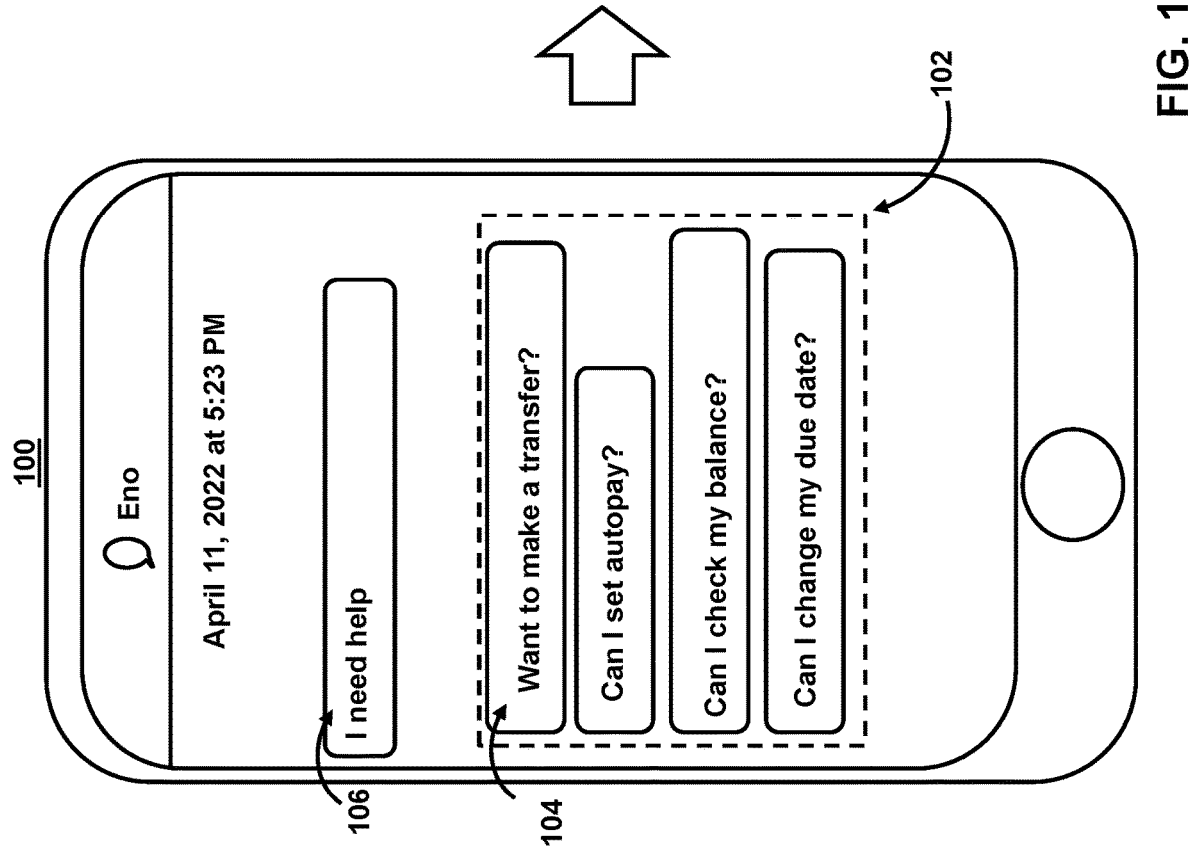

FIG. 1 shows an illustrative user interface for presenting dynamic conversational responses using machine learning models, in accordance with one or more embodiments. For example, FIG. 1 shows user interface 100 and user interface 150. The system (e.g., a mobile application and/or messaging application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.). For example, the system may use one or more artificial intelligence models (including machine learning models, neural networks, etc.), referred to herein collectively as machine learning models or simply "models."

As referred to herein, a "user interface" may comprise a human-computer interaction and communication in a device, and it may include display screens, keyboards, a mouse, and the appearance of a desktop. For example, a user interface may comprise a way a user interacts with an application or a website.

In order to maintain the conversational interaction, the system may need to generate responses (e.g., a conversational response) dynamically and/or in substantially real time. For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user. Furthermore, the response may include any type of content.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

For example, in response to a user action—which in some embodiments may comprise a user logging onto an application that generates user interface 100, inputting a query (e.g., query 106) into user interface 100, and/or a prior action (or lack thereof) by a user to a prior response generated by the system—the system may take one or more steps to generate dynamic conversational responses (e.g., response 104). These steps may include retrieving data about the user, retrieving data from other sources, monitoring user actions, and/or other steps in order to generate a feature input (e.g., as discussed below). In some embodiments, the system may generate a plurality of responses (e.g., responses 102).

In some embodiments, the feature input may include a vector that describes various information about a user, a user action, and/or a current or previous interaction with the user. The system may further select the information for inclusion in the feature input based on a predictive value. The information may be collected actively or passively by the system and compiled into a user profile.

In some embodiments, the information (e.g., a user action) may include conversation details, such as information about a current session, including a channel or platform (e.g., desktop web, iOS, or mobile), a launch page (e.g., the webpage that the application was launched from), a time of launch, and/or activities in a current or previous session before launching the application. The system may store this information, and all the data about a conversational interaction may be available in real time via HTTP messages and/or through data streaming or from more sources (e.g., via an API.).

In some embodiments, the information (e.g., a user action) may include user account information such as the types of accounts the user has; other accounts on file, such as bank accounts for payment; and information associated with accounts, such as credit limit, current balance, due date, recent payments, or recent transactions. The system may obtain this data in real time for model prediction through enterprise APIs.

In some embodiments, the information (e.g., a user action) may include insights about users provided to the application (e.g., via an API) from one or more sources, such as qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

For example, the system may determine optimal responses based on user actions. The system may do so by predicting an intent of a user. For example, the system may determine the intent using a first machine learning model, wherein the first machine learning model comprises a neural network trained to select a first intent from a plurality of intents based on historic data accumulated prior to the conversational interaction.

Alternatively or additionally, the first machine learning model may comprise a decision tree classifier. For example, a decision tree classifier may create a classification model by building a decision tree. Each node in the tree specifies a test on an attribute, and each branch descending from that node corresponds to one of the possible values for that attribute. Categories for potential intents may then be attributed to a given node. The decision tree classifier may select a first intent from a plurality of intents based on historic data accumulated prior to the conversational interaction. For example, decision tree construction does not involve any domain knowledge or parameter setting and therefore is appropriate for exploratory knowledge discovery. Decision trees can also handle multidimensional data. Because of this, the system may retrieve data from a plurality of sources and/or types. Accordingly, the system may pull data about a user, data about a user group, and/or user profile information.

The system may also train the neural network or decision tree classifier to optimize the predicted intents. The system may train the first machine learning model based on training data. For example, the system may receive a first labeled feature input, wherein the first labeled feature input is labeled with a first known dynamic conversational response for the first labeled feature input, and wherein the first known dynamic conversational response is based on a known intent for a plurality of users prior to beginning conversational interactions. The system may then train the first machine learning model to classify the first labeled feature input with the known dynamic conversational response.

For example, the system may determine that for a given person or population (e.g., a group of users) may be likely to have a given intent based on one or more factors. Accordingly, the system may generate different numbers of responses, at different time intervals, and/or with different content, depending on whether a given person or that person belongs to a given population. For example, the system may use time to determine the number of different conversational responses that are shown at one time to a user or the intervals at which the conversational response (or a new conversational response) is shown. For example, some users may prefer one fewer conversational response in a given time interval, while others may prefer more. Moreover, the system may determine the number and time interval of responses that allow a given user to reach a given response (e.g., the last response of a conversational interaction) and determine the different numbers of responses, different time intervals, and/or different content that achieves this, even if it conflicts with the preferences of a user.

The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include data about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system actively or passively monitoring the user.

For example, in order to maintain the conversational interaction, the system may need to generate a response (e.g., a conversational response) dynamically and/or in substantially real time. For example, the system may generate responses within the normal cadence of a conversation. In some embodiments, the system may continually determine a likely intent of the user in order to generate responses (e.g., in the form of prompts, notifications, and/or other communications) to the user.

The system may then receive a subsequent user action. For example, the system may receive a user action selecting response 104. In response to the selection, the system may generate responses 108 in user interface 150. To generate responses 108, the system may determine an interaction-specific intent of the conversational interaction. For example, the system may use a second machine learning model, wherein the second machine learning model comprises a neural network trained to select a first interaction-specific intent from a plurality of interaction-specific intents based on interaction-specific data for the user.

The system may train the second machine learning model based on training data. The system may receive a second labeled feature input, wherein the second labeled feature input is labeled with a second known dynamic conversational response for the second labeled feature input, and wherein the second known dynamic conversational response is based on a known interaction-specific intent for a plurality of users after beginning the conversational interactions. The system may train the second machine learning model to classify the second labeled feature input with the second known dynamic conversational response.

The system may additionally use information about where in the user interface a user previously interacted in order to improve the conversational interaction by both customizing conversational responses to this information as well as generating conversational responses in positions in the user interface based on this information.

User interface 150 includes a plurality of different positions, each associated with different metadata, functions, and/or user actions. For example, user actions may be performed through direct manipulation of the graphical elements in user interface 150, such as selecting an icon, entering textual information as a search field, etc. Moreover, in some embodiments, the system may receive user actions (or detect user inactions) by monitoring for, but not detecting, direct manipulations.

In such cases, the position in the user interface of the direct manipulation (or an area currently highlighted and/or last interacted with) may be detected, and the system may generate the conversational response based on that position. For example, the system may determine a first user interface position of the first user action in the user interface. The system may then retrieve metadata related to the first user interface position.

The metadata may describe a position, a function, a feature, a type of response, data used for the response, and/or other characteristic of the position. For example, the metadata may indicate that this position corresponds to a field in which a date is entered. The system may then modify the conversational response (or a feature input used to generate the conversational response) based on this information. For example, the system may determine that, based on the field corresponding to the data, a conversational response that is selected must also correspond to the data. In some embodiments, the system may also use other metadata. For example, the system may retrieve metadata that is unrelated to a current conversational response. Additionally or alternatively, the feature input may be based on metadata associated with any conversational response, user account, and/or activity context data that is related to a current user interface, in order to ensure the quality of the conversational responses. For example, the system may use metadata related to a location, time, event, device setting, etc. In some embodiments, the system may receive a first labeled feature input, wherein the first labeled feature input is labeled with a known dynamic conversational response for the first labeled feature input, and may train the first machine learning model to classify the first labeled feature input with the known dynamic conversational response based on contextual metadata related to the conversational interaction with the user interface.

For example, in user interface 150, the system may detect that the user action corresponds to response 110. In response, the system may generate conversational responses 108. The location, content, or method of determination of conversational responses 108 may be based on metadata associated with response 110. For example, since the metadata for response 110 indicated that the option related to a pay date, the system may retrieve user account information prior to generating the feature input and/or conversational response indicating a type of information (e.g., to be presented, to be used to determine the content, position, and method of determination for the conversational response) and/or information related to a user or users (e.g., a pay date of the user). The system may then determine a feature input and/or conversational response based on this information.

The location, content, or method of determination of conversational responses 108 may be based on metadata associated with response 112. For example, since the metadata for response 112 indicated that the option related to a user account, the system may retrieve user account information prior to generating the feature input and/or conversational response. The feature input and/or conversational response may then be based on this information.

In some embodiments, the system may further determine a position of a conversational response on the user interface based on the position. For example, the system may select a second user interface position for generating the dynamic conversational response based on the first user interface position. For example, in response to detecting that the user last interacted with a given window in the user interface, the system may generate for display a conversational response in the window. In such cases, the boundaries of the second user interface position may be located, wholly or in part, within the boundaries of the first user interface position.

Figure 2A:
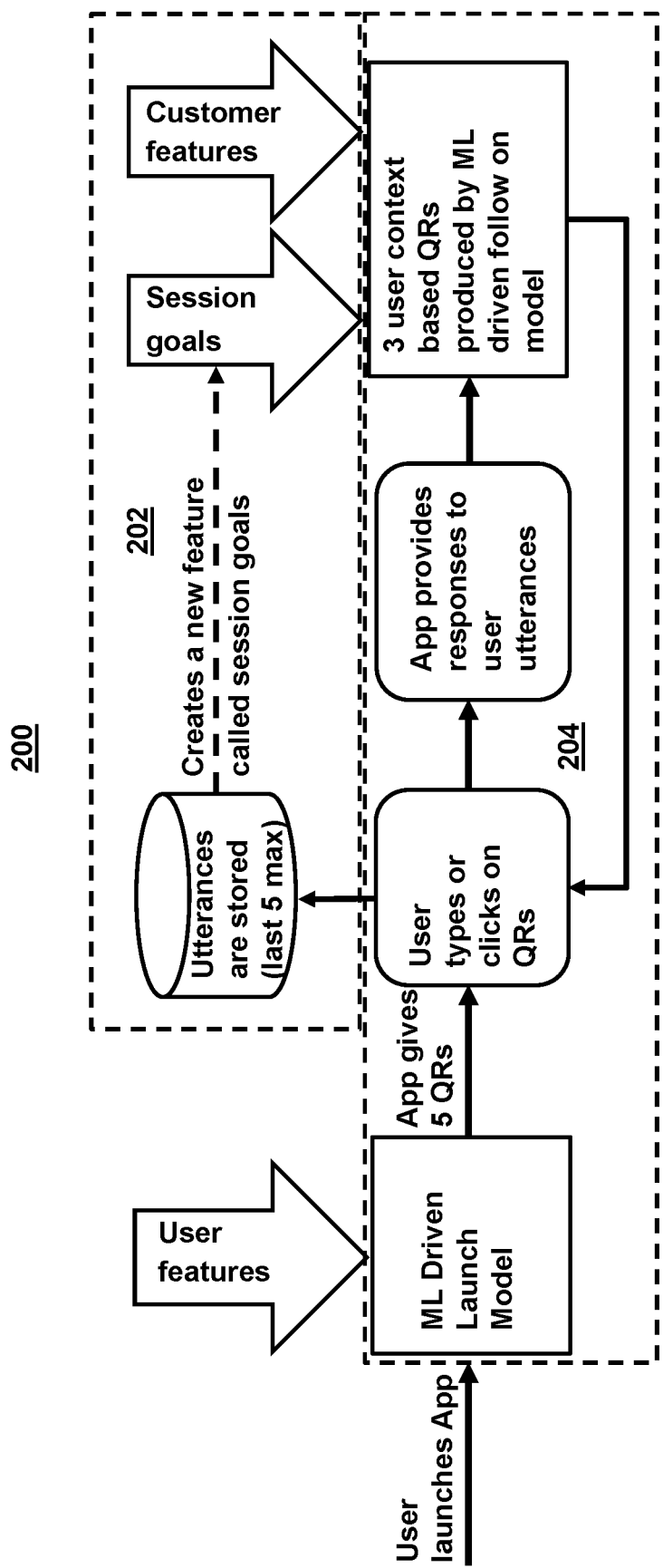
FIG. 2A is an illustrative diagram of an architecture of a machine learning model for generating dynamic conversational responses, in accordance with one or more embodiments.
Figure 3:
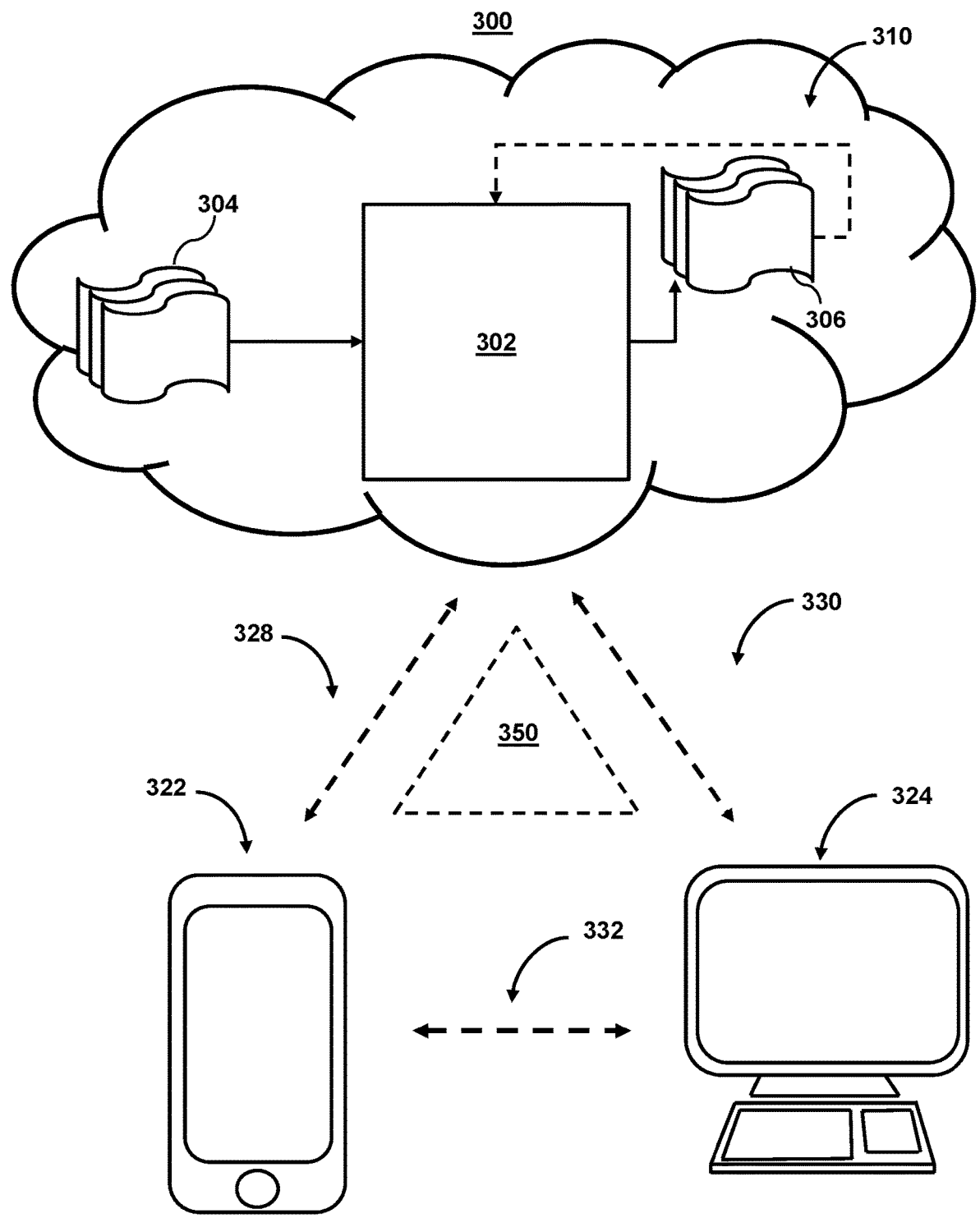
FIG. 3 is an illustrative system for generating dynamic conversational responses, in accordance with one or more embodiments.

FIG. 2A is an illustrative diagram of an architecture of a machine learning model for generating dynamic conversational responses, in accordance with one or more embodiments. For example, model 200 may correspond to the one or more machine learning models used to generate real-time dynamic conversational responses during conversational interactions using machine learning models based on historic intents for a plurality of users and user-specific interactions as described in FIG. 3. That is, in some embodiments, model 200 may correspond to model 302 (FIG. 3).

As shown in FIG. 2A, model 200 may include component 202. Component 202 may be a neural network. For example, component 202 may be a rule-based static mechanism. The rules are created by the subject matter experts (SMEs) in this form—if the user's previous in-session intent is A, then follow on with intents X, Y, and Z. Model 200 also includes component 204, which is a follow-on model that comprises a neural network. For example, component 204 may comprise a deep learning-based follow-on model that leverages both user features and previous in-session intents to predict follow-on intents. Notably, the use of component 202 in conjunction with component 204 in this manner created a 53% production accuracy (as opposed to only 10% of the previous rule-based methods).

In some embodiments, model 200 may power a messaging application to provide conversational responses. For example, the system (e.g., a messaging application) may comprise a digital financial assistant that provides the ability for users to ask for help using a natural language interface. The system may also have a recommendation engine that predicts the user's intent at the moment the user launches the system. For example, the system may comprise a first machine learning model, wherein the first machine learning model comprises a neural network trained to select a first intent from a plurality of intents based on historic data accumulated prior to the conversational interaction.

The system may also comprise a deep learning-based model, trained on user-specific features, that predicts the likely interaction-specific intents in the form of quick replies ("QRs"). The system may provide users with the option to click on one of those predicted intents (e.g., response 104) to receive additional information. The system then provides an appropriate response to the user's intent that is likely to meet the user's servicing needs.

The system may comprise a follow-on intent prediction mechanism to continue showing likely intents in the form of QRs depending on the prior intents the user had in the same conversational interaction. For example, each time a user interacts with the system during a conversational interaction, the system detects a user action. A conversational interaction may comprise several user actions in a sequence. Once the conversational interaction is completed, the system may record the known intent and/or interaction-specific intent of the user. The system may utilize this information to predict the next intent of the user for the following interaction.

After the first user action, the system may determine an interaction-specific intent of the user. The interaction-specific intent of the user comprises a prediction based on the previous user actions in the current conversational interaction. That is, the interaction-specific intent is based on user actions during the current conversational interaction (e.g., based on interaction-specific data for the user accumulated during the conversational interaction), whereas the intent is based on historic data accumulated prior to the conversational interaction.

For example, at the beginning of the conversational interaction (e.g., application launch), the user has not expressed any intent. As such, the system does not have a recorded user action of the user. Thus, the interaction-specific intent is set to null. In contrast, at the beginning of the conversational interaction, the system retrieves multi-modal and/or multidimensional data such as user account-specific information, any pages previously visited, any notifications the user received, etc.

These features do not change during the conversational interaction and are thus static features. Upon the receipt of a user action (e.g., corresponding to a prediction of an intent by component 202), the system uses this information (e.g., collected during the conversational interaction) to determine more information about the user (e.g., an interaction-specific intent).

To consume the existing features, the system comprises a launch model (e.g., component 202) and a sub-model (e.g., component 204). As the sub-model (e.g., component 204) tracks time-series data, the system may use Markov principles to utilize the nearest past intents. Moreover, because the intent sequence matters, the system may arrange the predicted interaction-specific intents in order of oldest to newest (e.g., using a Hierarchical Attention Network).

Figure 2B:
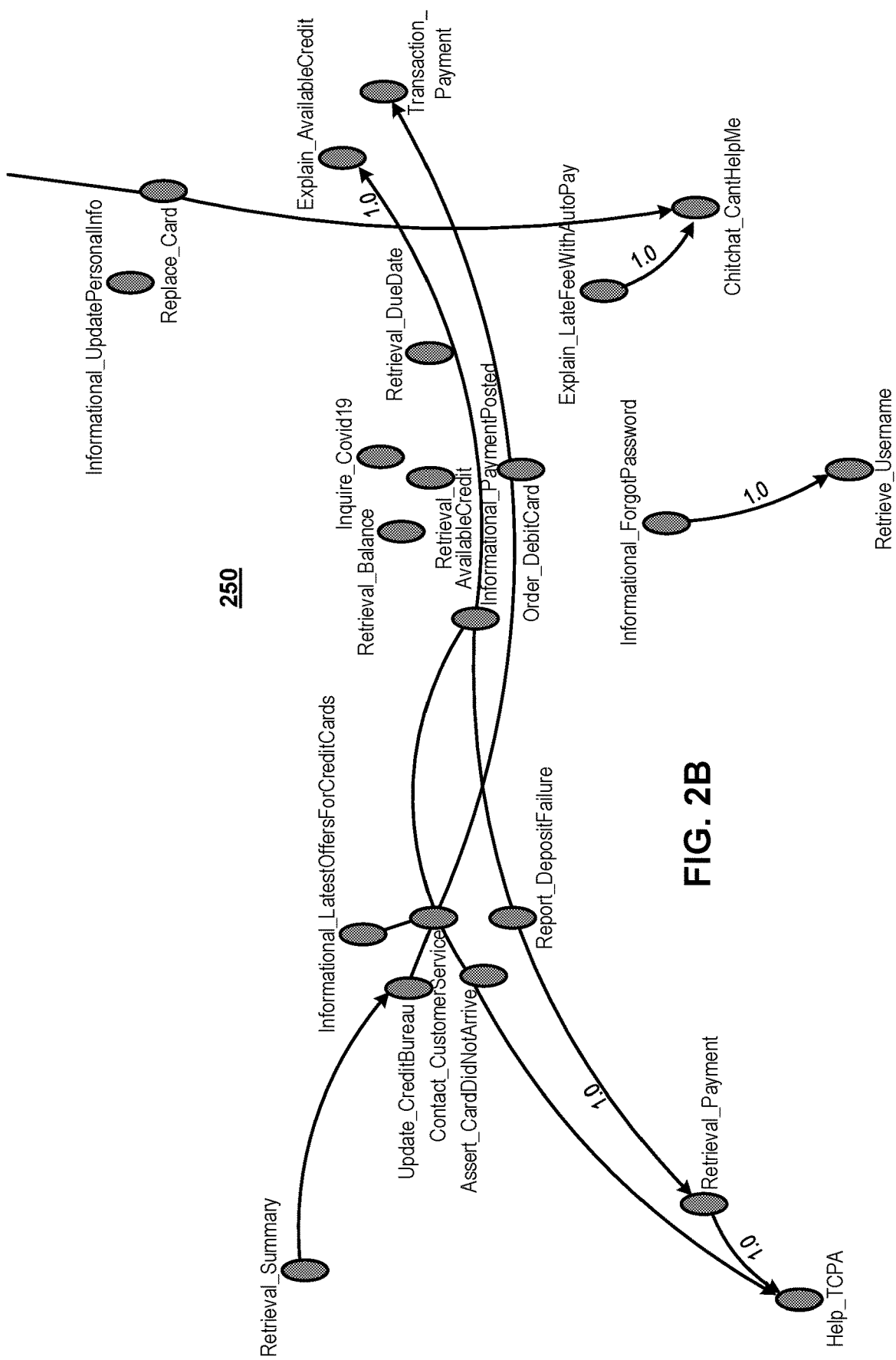
FIG. 2B shows an illustrative diagram of a graph neural network for use in presenting dynamic conversational responses, in accordance with one or more embodiments.

FIG. 2B shows an illustrative diagram of a graph neural network for use in presenting dynamic conversational responses, in accordance with one or more embodiments. For example, graph neural network 250 may comprise a graph neural network underlying a sub-model (e.g., component 204 (FIG. 2A)). For example, users may repeatedly have the same intents, which leads to users having interaction-specific intents having subsequences of the same consecutive intents. As a result, the system may train the model also to learn to repeat the same intents in follow-on QRs.

To do so, the system may plot a directed weighted multigraph of intents where each vertex is an intent and a directed edge is created by joining two consecutive intents (nodes) in a session (older to newer). The weights are simply the frequentist probability of occurring that particular edge in the graph. In this multi-graph, the self-loop may detect the events where users (e.g., customers) expressed the exact same intents consecutively. The system may then train the graph neural network to recognize, and make predictions on, the detected sequence. Additionally, the system may perform one or more normalizations on the data prior to generating an output. For example, the system may generate a homomorphic map to eliminate repetitive intents and prevent the appearance of duplicate QRs.

FIG. 3 is an illustrative system for generating dynamic conversational responses, in accordance with one or more embodiments. For example, system 300 may represent the components used for generating real-time dynamic conversational responses during conversational interactions using machine learning models based on historic intents for a plurality of users and user-specific interactions. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, or other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., based on recommended contact strategies).

Additionally, as mobile device 322 and user terminal 324 are shown as touchscreen devices, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational responses using machine learning models.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 4G or LTE network), a cable network, a public switched telephone network, or other types of communication networks or combinations of communication networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior transactions. Alternatively, or additionally, the system may act as a clearinghouse for multiple sources of information about the user. Cloud components 310 may also include control circuitry configured to perform the various operations needed to generate recommendations. For example, the cloud components 310 may include cloud-based storage circuitry configured to store a first machine learning model that is trained to select a dynamic conversational response from a plurality of dynamic conversational responses based on a first feature input. Cloud components 310 may also include cloud-based control circuitry configured to determine an intent of the user based on a machine learning model. Cloud components 310 may also include cloud-based I/O circuitry configured to generate the dynamic conversational response during a conversational interaction.

Cloud components 310 include machine learning model 302. Machine learning model 302 may take inputs 304 and provide outputs 306. The inputs may include multiple datasets such as a training dataset and a test dataset. Each of the plurality of datasets (e.g., inputs 304) may include data subsets related to user data, contact strategies, and results. In some embodiments, outputs 306 may be fed back to machine learning model 302 as input to train machine learning model 302 (e.g., alone or in conjunction with user indications of the accuracy of outputs 306, with labels associated with the inputs, or with other reference feedback information). For example, the system may receive a first labeled feature input, wherein the first labeled feature input is labeled with a known dynamic conversational response for the first labeled feature input. The system may then train the first machine learning model to classify the first labeled feature input with the known dynamic conversational response.

In another embodiment, machine learning model 302 may update its configurations (e.g., weights, biases, or other parameters) based on the assessment of its prediction (e.g., outputs 306) and reference feedback information (e.g., user indication of accuracy, reference labels, or other information). In another embodiment, where machine learning model 302 is a neural network, connection weights may be adjusted to reconcile differences between the neural network's prediction and the reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

In some embodiments, machine learning model 302 may include an artificial neural network. In such embodiments, machine learning model 302 may include an input layer and one or more hidden layers. Each neural unit of machine learning model 302 may be connected with many other neural units of machine learning model 302. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function that the signal must surpass before it propagates to other neural units. Machine learning model 302 may be self-learning and trained, rather than explicitly programmed, and can perform significantly better in certain areas of problem solving, as compared to traditional computer programs. During training, an output layer of machine learning model 302 may correspond to a classification of machine learning model 302 and an input known to correspond to that classification may be input into an input layer of machine learning model 302 during training. During testing, an input without a known classification may be input into the input layer, and a determined classification may be output.

In some embodiments, machine learning model 302 may include multiple layers (e.g., where a signal path traverses from front layers to back layers). In some embodiments, backpropagation techniques may be utilized by machine learning model 302 where forward stimulation is used to reset weights on the "front" neural units. In some embodiments, stimulation and inhibition for machine learning model 302 may be more free-flowing, with connections interacting in a more chaotic and complex fashion. During testing, an output layer of machine learning model 302 may indicate whether or not a given input corresponds to a classification of machine learning model 302 (e.g., whether a first length of time corresponds to lengths of programming time for previously completed stories by contributors without a required skill).

In some embodiments, model 302 may predict a goal or intent of a user. This goal or intent may be selected from a plurality of goals and/or intents stored by the system. For example, the system may determine that users who ask similar questions about payment have similar account information and digital activities. The system may further determine that the users tend to be different from those of users who have a one-off type of request, such as lost card reports or travel notifications. In some embodiments, the model (e.g., model 302) may automatically perform actions based on output 306. In some embodiments, the model (e.g., model 302) may not perform any actions on a user's account. The output of the model (e.g., model 302) is used only to decide which dynamic conversational responses to display to a user.

System 300 also includes API layer 350. API layer 350 may allow the system to generate recommendations across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside, in this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use strong security constraints applying WAF and DDoS protection, and API layer 350 may use RESTful APIs as standard for external integration.

Figure 4:
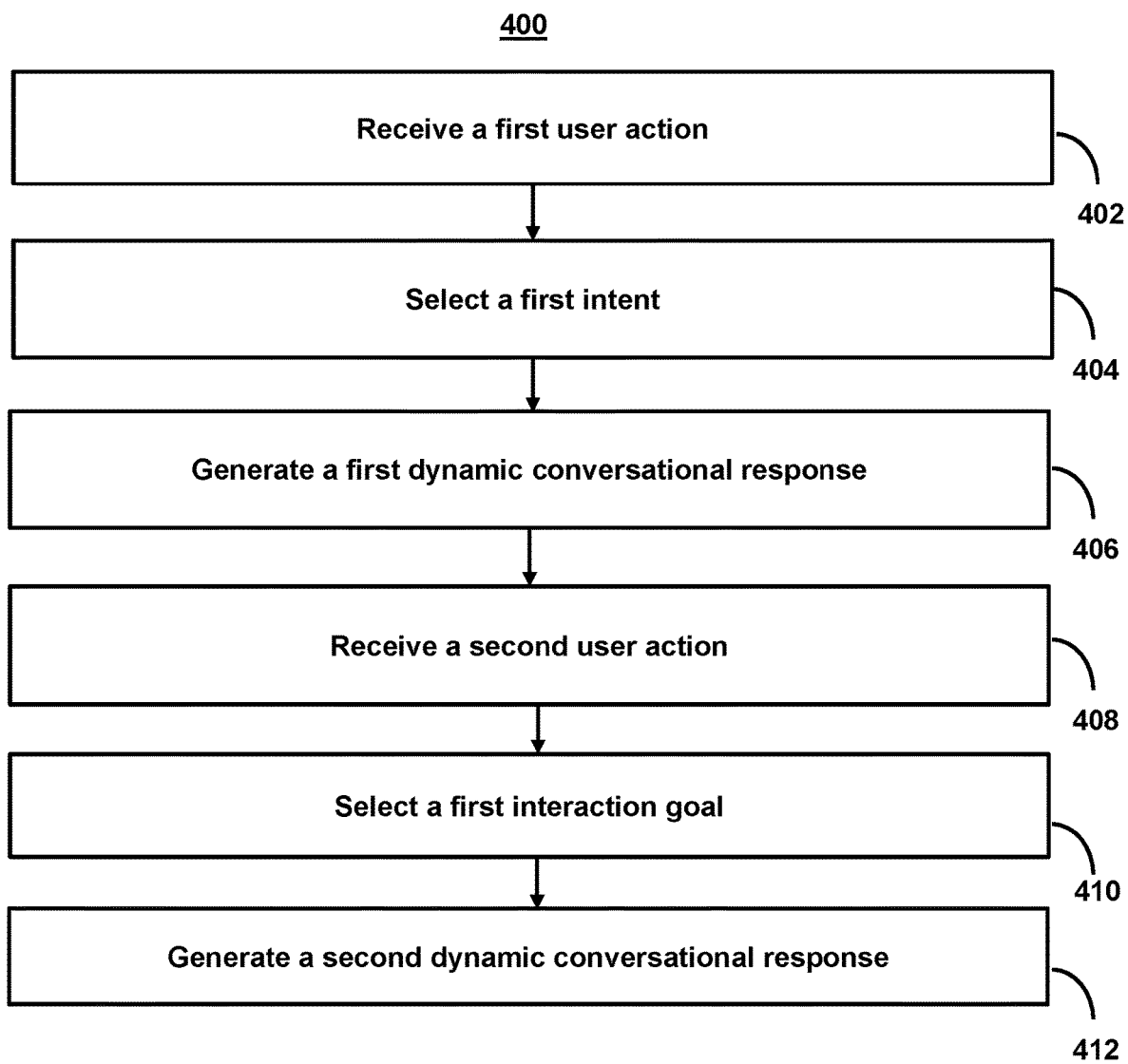
FIG. 4 shows a flowchart of the steps involved in generating dynamic conversational responses using a machine learning model, in accordance with one or more embodiments.

FIG. 4 shows a flowchart of the steps involved in generating real-time dynamic conversational responses during conversational interactions using machine learning models based on historic intents for a plurality of users and user-specific interactions, in accordance with one or more embodiments. For example, process 400 may represent the steps taken by one or more devices as shown above.

At step 402, process 400 (e.g., using one or more components in system 300 (FIG. 3)) receives a first user action. For example, the system may receive, using control circuitry, a first user action during a conversational interaction with a user interface. For example, the system may receive a user action as described in FIG. 1.

At step 404, process 400 (e.g., using one or more components in system 300 (FIG. 3)) selects a first intent. For example, the system may generate a first feature input based on the first user action. The system may then input the first feature input into a first machine learning model, wherein the first machine learning model comprises a neural network trained to select a first intent from a plurality of intents based on historic data accumulated prior to the conversational interaction.

The system may train the first machine learning model based on training data. For example, the system may receive a first labeled feature input, wherein the first labeled feature input is labeled with a first known dynamic conversational response for the first labeled feature input, and wherein the first known dynamic conversational response is based on a known intent for a plurality of users prior to beginning conversational interactions. The system may then train the first machine learning model to classify the first labeled feature input with the known dynamic conversational response.

In some embodiments, the system may monitor for one or more other user actions and/or user action types. For example, in response to detecting a third user action, the system may determine a result of the first user action (e.g., a user input value, a conversational response as a result of the user action, etc.). The system may then generate a third feature input based on the result. The system may then input the third feature input into a third machine learning model, wherein the third machine learning model is trained to determine a level of variance of the result from prior results of prior user actions. For example, the system may determine whether the result of the user action (e.g., a resulting account value) corresponds to a normal account level of the user. The system may then compare the level of variance to a threshold level. In response to the level of variance exceeding the threshold, the system may generate, at the user interface, a push notification (and/or other communication) based on the level of variance.

In some embodiments, the system may also monitor for, generate feature inputs on, and/or determine other features for use in generating conversational responses. For example, the system may determine a first user interface position of the first user action in the user interface. The system may then retrieve metadata related to the first user interface position, wherein the first feature input is further based on the metadata. For example, the metadata may describe a feature or function associated with that position of the user interface. Additionally, or alternatively, the system may select a second user interface position for generating the dynamic conversational response based on the first user interface position. For example, the system may generate a conversational response at the same position as where a user action was entered and/or a position currently highlighted by a user. In some embodiments, boundaries of the second user interface position are located within boundaries of the first user interface position. For example, if a user is interacting with a menu in a window of a user interface, the system may generate conversational responses within the menu.

At step 406, process 400 (e.g., using one or more components in system 300 (FIG. 3)) generates a first dynamic conversational response. For example, the system may generate for display, at the user interface during the conversational interaction, a first dynamic conversational response based on the first intent.

At step 408, process 400 (e.g., using one or more components in system 300 (FIG. 3)) receives a second user action. For example, the system may receive, from the user, a second user action during the conversational interaction.

At step 410, process 400 (e.g., using one or more components in system 300 (FIG. 3)) selects a first interaction-specific intent. For example, the system may generate a second feature input based on the second user action and the first intent. The system may input the second feature input into a second machine learning model, wherein the second machine learning model comprises a neural network trained to select a first interaction-specific intent from a plurality of interaction-specific intents based on interaction-specific data for the user accumulated during the conversational interaction.

The system may train the second machine learning model based on training data. The system may receive a second labeled feature input, wherein the second labeled feature input is labeled with a second known dynamic conversational response for the second labeled feature input, and wherein the second known dynamic conversational response is based on a known interaction-specific intent for a plurality of users after beginning the conversational interactions. The system may train the second machine learning model to classify the second labeled feature input with the second known dynamic conversational response.

In some embodiments, the second machine learning model may comprise a graph neural network trained to predict a next node in an intent graph based on a current node. For example, the system may generate an array and/or vector of values that corresponds to the user action. By doing so, the system may create a representation of the user action that may be processed by the first machine learning model.

At step 412, process 400 (e.g., using one or more components in system 300 (FIG. 3)) generates a second dynamic conversational response. For example, the system may generate for display, at the user interface during the conversational interaction, a second dynamic conversational response based on the first interaction-specific intent.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one of more of the steps in FIG. 4.

Figure 5:
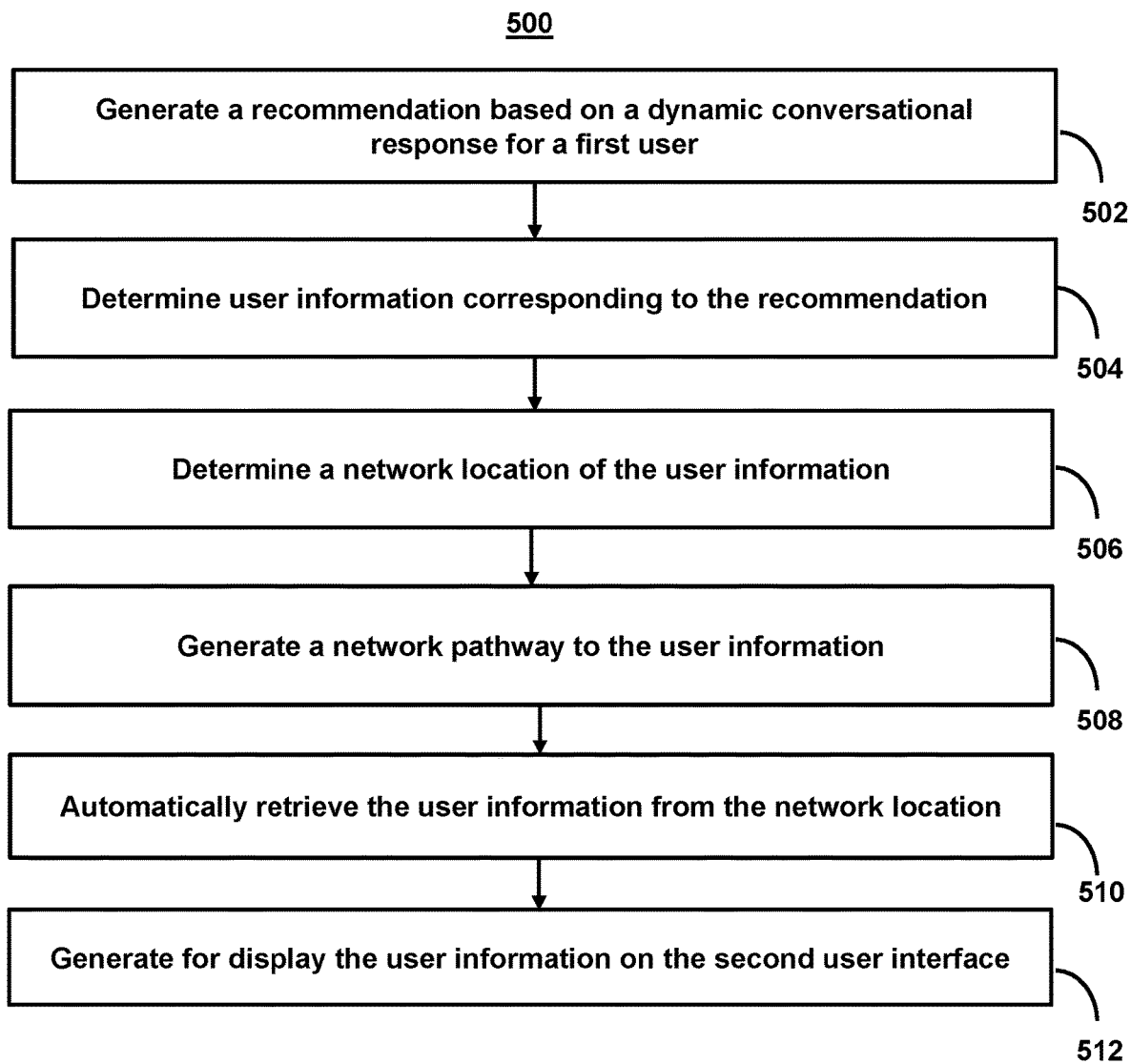
FIG. 5 shows a flowchart of the steps involved in generating user information on a second user interface based on a user action on a first user interface, in accordance with one or more embodiments.

FIG. 5 shows a flowchart of the steps involved in generating user information on a second user interface based on a user action on a first user interface, in accordance with one or more embodiments. For example, process 500 may represent the steps taken by one or more devices, as shown above, when generating user information. For example, in some embodiments, a user may end a conversational interaction with an application generating dynamic conversational responses (e.g., a mobile application). The user may then contact (e.g., via the same or a different platform) another user. The other user may be, e.g., a service representative associated with a provider of the application. In order to improve the conversational interaction between the first and the second user, the system may provide a recommendation to the second user about potential questions that the first user may have. Additionally or alternatively, the system may locate information in the system of the second user, determine a network pathway to quickly and efficiently retrieve this information, and/or pre-fetch this information. In each case, the system may more efficiently (and in less time) obtain relevant information that may inform the second user about potential questions of the first user. Thus, the conversational interaction between the first and second user may be improved.

At step 502, process 500 (e.g., using one or more components in system 300 (FIG. 3)) generates, at a user interface corresponding to a second user, a recommendation based on a dynamic conversational response for a first user. For example, the system may, in response to detecting a user action, monitor for another user action, wherein the other user action is not received via the user interface, and wherein the other user action corresponds to a first user contacting a second user. In response to detecting the other user action, the system may generate, at a second user interface corresponding to the second user, a recommendation based on the dynamic conversational response selected by the machine learning model.

At step 504, process 500 (e.g., using one or more components in system 300 (FIG. 3)) determines user information corresponding to the recommendation. For example, the system may determine user information corresponding to the recommendation at the first user interface.

At step 506, process 500 (e.g., using one or more components in system 300 (FIG. 3)) determines a network location of the user information. For example, the system may determine a network location of the user information (e.g., on a network associated with the second user interface).

At step 508, process 500 (e.g., using one or more components in system 300 (FIG. 3)) generates a network pathway to the user information. For example, the system may generate a network pathway (e.g., on the network associated with the second user interface) to the user information.

At step 510, process 500 (e.g., using one or more components in system 300 (FIG. 3)) automatically retrieves the user information from the network location. For example, the system may automatically retrieve the user information from the network location in response to the other user action.

At step 512, process 500 (e.g., using one or more components in system 300 (FIG. 3)) generates for display the user information on the second user interface. For example, the system may generate for display the user information on the second user interface of the second user, wherein the second user interface is located remotely from the first user interface.

It is contemplated that the steps or descriptions of FIG. 5 may be used with any other embodiment of this disclosure. In addition, the steps and descriptions described in relation to FIG. may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, from a first user, a first user action during a conversational interaction with a user interface; generating a first feature input based on the first user action; inputting the first feature input into a first machine learning model, wherein the first machine learning model comprises a neural network trained to select a first intent from a plurality of intents based on historic data accumulated prior to the conversational interaction; generating for display, at the user interface during the conversational interaction, a first dynamic conversational response based on the first intent; receiving, from the first user, a second user action during the conversational interaction; generating a second feature input based on the second user action and the first intent; inputting the second feature input into a second machine learning model, wherein the second machine learning model comprises a neural network trained to select a first interaction-specific intent from a plurality of interaction-specific intents based on interaction-specific data for the first user accumulated during the conversational interaction; and generating for display, at the user interface during the conversational interaction, a second dynamic conversational response based on the first interaction-specific intent.
2. The method of the preceding embodiment, wherein the method is for generating real-time dynamic conversational responses during conversational interactions using machine learning models based on historic intents for a plurality of users and user-specific interactions.
3. The method of any one of the preceding embodiments, further comprising: determining a first user interface position of the first user action in the user interface; and retrieving metadata related to the first user interface position, wherein the first feature input is further based on the metadata.
4. The method of any one of the preceding embodiments, further comprising selecting a second user interface position for generating the first dynamic conversational response based on the first user interface position.
5. The method of any one of the preceding embodiments, wherein the first machine learning model comprises a graph neural network trained to predict a next node in an intent graph based on a current node.
6. The method of any one of the preceding embodiments, further comprising, while monitoring for the second user action, monitoring for a third user action during the conversational interaction with the user interface, wherein the third user action corresponds to a user-initiated end to the conversational interaction.
7. The method of any one of the preceding embodiments, further comprising: in response to detecting the third user action, determining a result of the first user action; generating a third feature input based on the result; inputting the third feature input into a third machine learning model, wherein the third machine learning model is trained to determine a level of variance of the result from prior results of prior user actions; and generating, at the user interface, a push notification based on the level of variance.
8. The method of any one of the preceding embodiments, further comprising: in response to detecting the third user action, monitoring for a fourth user action, wherein the fourth user action is not received via the user interface, and wherein the fourth user action corresponds to the first user contacting a second user; and in response to detecting the fourth user action, generating, at a second user interface corresponding to the second user, a recommendation based on the first dynamic conversational response.
9. The method of any one of the preceding embodiments, further comprising: determining user information corresponding to the recommendation; determining a network location of the user information; and generating a network pathway to the user information.

10. The method of any one of the preceding embodiments, further comprising: automatically retrieving the user information from the network location in response to the fourth user action; and generating for display the user information on the second user interface.

11. The method of any one of the preceding embodiments, further comprising: receiving a first labeled feature input, wherein the first labeled feature input is labeled with a first known dynamic conversational response for the first labeled feature input, and wherein the first known dynamic conversational response is based on a known intent for a plurality of users prior to beginning conversational interactions; training the first machine learning model to classify the first labeled feature input with the known dynamic conversational response; receiving a second labeled feature input, wherein the second labeled feature input is labeled with a second known dynamic conversational response for the second labeled feature input, and wherein the second known dynamic conversational response is based on a known interaction-specific intent for a plurality of users after beginning the conversational interactions; and training the second machine learning model to classify the second labeled feature input with the second known dynamic conversational response.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

What is claimed is:

1. A system for generating real-time dynamic conversational responses during conversational interactions with messaging applications using machine learning models based on historic intents for a plurality of users and user-specific interactions, the system comprising:
storage circuitry configured to store:
a first machine learning model, wherein the first machine learning model comprises a neural network trained to select a first intent from a plurality of intents based on historic data accumulated prior to conversational interactions; and
a second machine learning model, wherein the second machine learning model is based on the first machine learning model as augmented with a neural network, and wherein the neural network is trained to select a first interaction-specific intent from a plurality of interaction-specific intents based on interaction-specific data for a first user accumulated during the conversational interactions;
control circuitry configured to:
receive, from the first user, a first user action during a conversational interaction with a user interface of a messaging application, wherein the conversational interaction comprises an interactive exchange of text messages between the first user and the messaging application;
determine a static feature, wherein the static feature remains constant during the conversational interaction;
generate a first feature input based on the first user action;
input the first feature input into the first machine learning model to determine the first intent;
receive, from the first user, a second user action during the conversational interaction;
determine a temporal relationship between the first user action and the second user action;
generate a second feature input based on the first user action, the second user action, the static feature, the temporal relationship, and the first intent;
input the second feature input into the second machine learning model to determine the first interaction-specific intent; and
input/output circuitry configured to:
generate for display, at the user interface during the conversational interaction, a first dynamic conversational response based on the first intent, wherein the first dynamic conversational response comprises a first text message; and
generate for display, at the user interface during the conversational interaction, a second dynamic conversational response based on the first interaction-specific intent, wherein the second dynamic conversational response comprises a second text message.

2. A method for generating real-time dynamic conversational responses during conversational interactions using machine learning models based on historic intents for a plurality of users and user-specific interactions, the method comprising:
receiving, from a first user, a first user action during a conversational interaction with a user interface;
determining a static feature, wherein the static feature remains constant during the conversational interaction;
generating a first feature input based on the first user action and the static feature;
inputting the first feature input into a first machine learning model, wherein the first machine learning model comprises a neural network trained to select a first intent from a plurality of intents based on historic data accumulated prior to the conversational interaction;
generating for display, at the user interface during the conversational interaction, a first dynamic conversational response based on the first intent;
receiving, from the first user, a second user action during the conversational interaction;
determining a temporal relationship between the first user action and the second user action;
generating a second feature input based on the first user action, the second user action, the static feature, the temporal relationship, and the first intent;
inputting the second feature input into a second machine learning model, wherein the second machine learning model is based on the first machine learning model as augmented with a neural network, and wherein the neural network is trained to select a first interaction-specific intent from a plurality of interaction-specific intents based on interaction-specific data for the first user accumulated during the conversational interaction; and
generating for display, at the user interface during the conversational interaction, a second dynamic conversational response based on the first interaction-specific intent.

3. The method of claim 2, further comprising:
determining a first user interface position of the first user action in the user interface; and retrieving metadata related to the first user interface position, wherein the first feature input is further based on the metadata.

4. The method of claim 3, further comprising selecting a second user interface position for generating the first dynamic conversational response based on the first user interface position.

5. The method of claim 2, wherein the first machine learning model comprises a graph neural network trained to predict a next node in an intent graph based on a current node.

6. The method of claim 2, further comprising, while monitoring for the second user action, monitoring for a third user action during the conversational interaction with the user interface, wherein the third user action corresponds to a user-initiated end to the conversational interaction.

7. The method of claim 6, further comprising:
in response to detecting the third user action, determining a result of the first user action;
generating a third feature input based on the result;
inputting the third feature input into a third machine learning model, wherein the third machine learning model is trained to determine a level of variance of the result from prior results of prior user actions; and
generating, at the user interface, a push notification based on the level of variance.

8. The method of claim 6, further comprising:
in response to detecting the third user action, monitoring for a fourth user action, wherein the fourth user action is not received via the user interface, and wherein the fourth user action corresponds to the first user contacting a second user; and
in response to detecting the fourth user action, generating, at a second user interface corresponding to the second user, a recommendation based on the first dynamic conversational response.

9. The method of claim 8, further comprising:
determining user information corresponding to the recommendation;
determining a network location of the user information; and
generating a network pathway to the user information.

10. The method of claim 9, further comprising:
automatically retrieving the user information from the network location in response to the fourth user action; and
generating for display the user information on the second user interface.

11. The method of claim 2, further comprising:
receiving a first labeled feature input, wherein the first labeled feature input is labeled with a first known dynamic conversational response for the first labeled feature input, and wherein the first known dynamic conversational response is based on a known intent for a plurality of users prior to beginning conversational interactions;
training the first machine learning model to classify the first labeled feature input with the first known dynamic conversational response;
receiving a second labeled feature input, wherein the second labeled feature input is labeled with a second known dynamic conversational response for the second labeled feature input, and wherein the second known dynamic conversational response is based on a known interaction-specific intent for a plurality of users after beginning the conversational interactions; and
training the second machine learning model to classify the second labeled feature input with the second known dynamic conversational response.

12. A non-transitory, computer-readable medium for generating dynamic conversational responses using machine learning models, comprising instructions that, when executed by one or more processors, cause operations comprising:
receiving, from a first user, a first user action during a conversational interaction with a user interface;
determining a static feature, wherein the static feature remains constant during the conversational interaction;
generating a first feature input based on the first user action and the static feature;
inputting the first feature input into a first machine learning model, wherein the first machine learning model comprises a neural network trained to select a first intent from a plurality of intents based on historic data accumulated prior to the conversational interaction;
generating for display, at the user interface during the conversational interaction, a first dynamic conversational response based on the first intent;
receiving, from the first user, a second user action during the conversational interaction;
determining a temporal relationship between the first user action and the second user action;
generating a second feature input based on the first user action, the second user action, the static feature, the temporal relationship, and the first intent;
inputting the second feature input into a second machine learning model, wherein the second machine learning model is based on the first machine learning model as augmented with a neural network, and wherein the neural network is trained to select a first interaction-specific intent from a plurality of interaction-specific intents based on interaction-specific data for the first user accumulated during the conversational interaction; and
generating for display, at the user interface during the conversational interaction, a second dynamic conversational response based on the first interaction-specific intent.

13. The non-transitory, computer-readable medium of claim 12, wherein the instructions further cause operations comprising:
determining a first user interface position of the first user action in the user interface; and
retrieving metadata related to the first user interface position, wherein the first feature input is further based on the metadata.

14. The non-transitory, computer-readable medium of claim 13, wherein the instructions further cause operations comprising selecting a second user interface position for generating the first dynamic conversational response based on the first user interface position.

15. The non-transitory, computer-readable medium of claim 12, wherein the first machine learning model comprises a graph neural network trained to predict a next node in an intent graph based on a current node.

16. The non-transitory, computer-readable medium of claim 12, wherein the instructions further cause operations comprising, while monitoring for the second user action, monitoring for a third user action during the conversational interaction with the user interface, wherein the third user action corresponds to a user-initiated end to the conversational interaction.

17. The non-transitory, computer-readable medium of claim 16, wherein the instructions further cause operations comprising:

in response to detecting the third user action, determining a result of the first user action;
generating a third feature input based on the result;
inputting the third feature input into a third machine learning model, wherein the third machine learning model is trained to determine a level of variance of the result from prior results of prior user actions; and
generating, at the user interface, a push notification based on the level of variance.

18. The non-transitory, computer-readable medium of claim 16, wherein the instructions further cause operations comprising:

in response to detecting the third user action, monitoring for a fourth user action, wherein the fourth user action is not received via the user interface, and wherein the fourth user action corresponds to the first user contacting a second user; and
in response to detecting the fourth user action, generating, at a second user interface corresponding to the second user, a recommendation based on the first dynamic conversational response.

19. The non-transitory, computer-readable medium of claim 18, wherein the instructions further cause operations comprising:

determining user information corresponding to the recommendation;
determining a network location of the user information;
generating a network pathway to the user information;
automatically retrieving the user information from the network location in response to the fourth user action; and
generating for display the user information on the second user interface.

20. The non-transitory, computer-readable medium of claim 12, wherein the instructions further cause operations comprising:

receiving a first labeled feature input, wherein the first labeled feature input is labeled with a first known dynamic conversational response for the first labeled feature input, and wherein the first known dynamic conversational response is based on a known intent for a plurality of users prior to beginning conversational interactions;
training the first machine learning model to classify the first labeled feature input with the first known dynamic conversational response;
receiving a second labeled feature input, wherein the second labeled feature input is labeled with a second known dynamic conversational response for the second labeled feature input, and wherein the second known dynamic conversational response is based on a known interaction-specific intent for a plurality of users after beginning the conversational interactions; and
training the second machine learning model to classify the second labeled feature input with the second known dynamic conversational response.

\* \* \* \* \*